INVENTORS
HOWARD C. POULTER
HOWARD W. HARRINGTON
RICHARD H. BAUHAUS

BY Q.C. Smith

ATTORNEY

United States Patent Office 3,440,529
Patented Apr. 22, 1969

3,440,529
A METHOD FOR SPECTROSCOPICALLY ANALYZING A SAMPLE BY DETECTING A RADIATION FIELD CHANGE AS A FUNCTION OF THE RADIATION POWER DENSITY IN THE SAMPLE
Richard H. Bauhaus, Howard W. Harrington, and Howard C. Poulter, Palo Alto, Calif., assignors to Hewlett-Packard Company, Palo Alto, Calif., a corporation of California
Filed Feb. 21, 1966, Ser. No. 528,854
Int. Cl. G01r 27/04
U.S. Cl. 324—58.5         9 Claims

ABSTRACT OF THE DISCLOSURE

Electromagnetic radiation is applied to a sample of matter to produce a spectroscopic transition that causes a change in each field component of the applied electromagnetic radiation. The change in each field component is varied by varying the power density of the electromagnetic radiation applied to the sample. Variations in the change of a selected field component are detected as a function of the variations in power density under power saturated conditions to determine the maximum change of the selected field component.

---

This invention relates to a method for analyzing a sample of matter of the type in which a spectroscopic transition may be produced by the interaction of electromagnetic radiation with the sample.

In the past such methods have been generally concerned with detecting the electromagnetic radiation frequency at which a selected spectroscopic transition occurs in the sample and the electromagnetic radiation power change associated with the selected spectroscopic transition. However, it is an object of this invention to provide a method which is concerned with detecting the electromagnetic radiation field change associated with a selected spectroscopic transition in the sample as a function of the electromagnetic radiation density in the sample for the purpose of determining the maximum electromagnetic radiation field change.

It is another object of this invention to provide a method for improving the acquisition and interpretation of certain spectroscopy data already available and for making possible the acquisition of additional spectroscopy data.

Other and incidental objects of this invention will become apparent from a reading of this specification and an inspection of the accompanying drawing in which.

Figure 1:
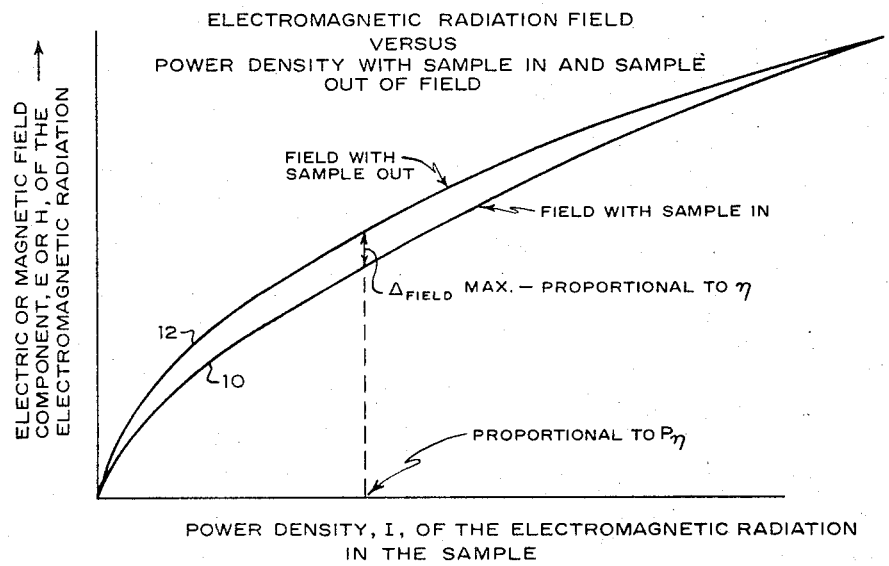
FIGURE 1 is a plot for either the electric field component or the magnetic field component showing the electromagnetic radiation field change associated with a selected spectroscopic transition produced by interaction of the electromagnetic radiation with the sample to be analyzed as a function of the power density in the sample of the electromagnetic radiation interacting with the sample.

In general this method comprises as one step applying electromagnetic radiation to the sample of matter to be analyzed for interacting the eletcromagnetic radiation with the sample to produce a selected spectroscopic transition in the sample. A change, $\Delta_{field}$, in the field components of the electromagnetic radiation interacting with the sample is associated with the spectroscopic transition as shown in FIGURE 1 by the spacing between curve 10, which corresponds to interaction between the applied electromagnetic radiation and the sample, and curve 12, which corresponds to the absence of sample in the field of the applied electromagnetic radiation. This electromagnetic radiation field change, $\Delta_{field}$, varies with the power density in the sample of the electromagnetic radiation interacting with the sample as further shown in FIGURE 1. A maximum electric field change, $\Delta_{field}$ MAX., will be observed if the amount of electromagnetic radiation energy change caused by interaction with the sample to produce the spectroscopic transition approaches a constant value as the electromagnetic radiation power density in the sample is increased, in other words if power saturation occurs. Thus, as another step by detecting the change, $\Delta_{field}$, in the electromagnetic radiation interacting with the sample while varying the electromagnetic radiation power density in the sample the maximum electromagnetic radiation field change, $\Delta_{field}$ MAX., may be determined either by direct measurement or by extrapolation. As shown below this maximum electromagnetic radiation field change, $\Delta_{field}$ MAX., has useful properties which, for example, make it and the electromagnetic radiation power density required to produce it useful for examining dipole moments, rotational energy transfer, relaxation processes and other molecular properties.

Some of the useful properties of the electromagnetic radiation field change, $\Delta_{field}$ MAX., may be illustrated in the specific context of the gas-phase pure rotational spectroscopic transitions observed with a Stark-modulated microwave spectrometer, since these spectroscopic transitions readily power saturate. For a Stark-modulated microwave spectrometer tuned to an absorption frequency of the gas-phase sample and using a conventional Stark cell the microwave power is attenuated according to the Beers-Lamberts relationship, (1)  $\quad P = P_0 \exp(-\gamma L)$ In Equation 1 P is the power after the incident power, $P_0$, has passed a distance of L through the sample with an absorption or intensity coefficient $\gamma$. Since $P_0 = E_0^2 1Z$ where Z is the impedance and $E_0$ the incident microwave electric field, Equation 1 can be rewritten as (2)  $\quad E_0 - E \equiv \Delta E = E_0 \gamma L / 2$ In Equation 2 the approximation is made that $\gamma L \ll 1$ so that only the first term in the expansion of the exponential in Equation 1 need be considered. The microwave electric field at the detector can be written, neglecting higher order side bands, as (3)  $\quad E_{detector} = E_0 \sin \omega t - A[\sin (\omega + \omega_m)t + \sin (\omega - \omega_m)t]$ where $\omega$ is the angular frequency of the absorption and $t$ is the time. The amplitude factor of the $\omega_m$ side bands is given as (4)  $\quad A = E_0 \gamma L / 2\pi$ Because of power saturation, the intensity coefficient $\gamma$ becomes (5)  $\quad \gamma = \dfrac{\gamma_0}{1 + K'E_0^2}$ It can be assumed with no loss of generality that the microwave electric field is uniformly distributed in the sample. Combining Equations 4 and 5 yields (6)  $\quad A = \dfrac{E_0 \gamma_0 L}{2\pi(1 + K'E_0^2)}$ The maximum value of A as a function of $E_0^2$ is found by setting the first derivative of A with respect to $E_0$ equal to zero. It is thusly found that A has a maximum value when (7) $\quad E_0^2 = 1/K'$ Combination of Equations 6 and 7 gives (8) $\quad A_{\text{MAX.}} = \eta = \dfrac{L\gamma_0}{4\pi\sqrt{K'}}$ where $A_{\text{MAX}}$ is the maximum side band field amplitude and is directly proportional to the observed signal in a Stark-modulated microwave spectrometer operated in accordance with the principles of this invention. To evaluate the properties of $\eta$ the expressions for $\gamma_0$ and $K'$ must be substituted into Equation 8. The unsaturated intensity coefficient $\gamma_0$ can be written as (9) $\quad \gamma_0 = \dfrac{16\pi^3}{3ck} |\mu_{ij}|^2 \dfrac{FN}{T} \nu_0^2 \tau$ where:

$c$ = velocity of light,
$k$ = Boltzmann's constant,
$|\mu_{1j}|^2$ = square of the dipole matrix element,
$\nu_0$ = frequency of absorption,
$N$ = number of molecules per unit volume (i.e., molecular concentration),
$F$ = fraction of molecules in the lower of the states in the transition,
$\tau$ = mean time between molecular collisions which broaden the line (i.e., broadening time), and
$T$ = temperature in degrees Kelvin.

The quantity $K'$ is given as

(10) $\quad K' = \dfrac{4\pi^2}{3h^2} |\mu_{ij}|^2 t \tau$ $h$ = Plank's constant and
$t$ = meantime between equilibrium restoring collisions (i.e. relaxation time).

Figure 2:
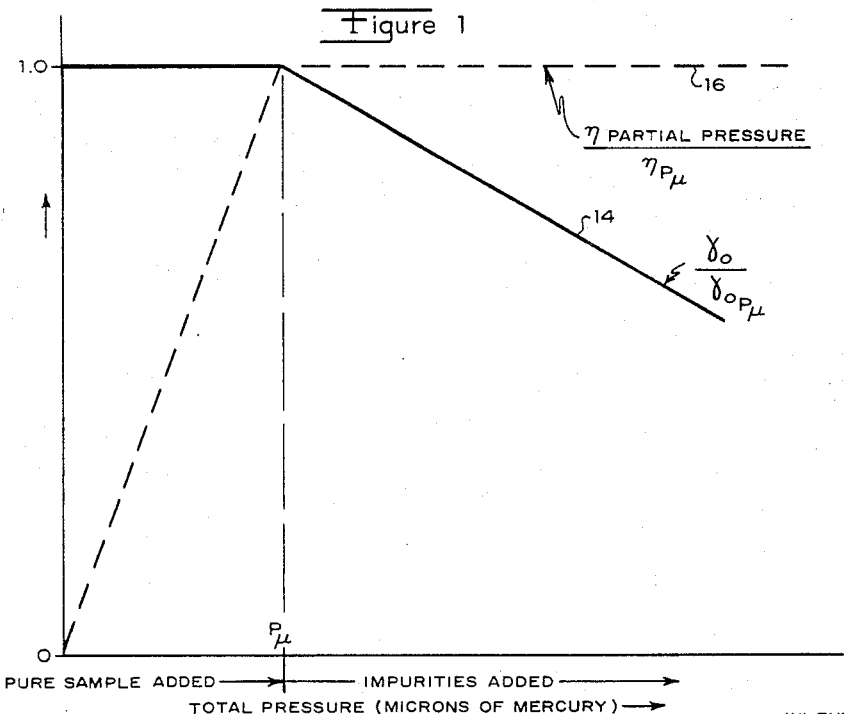
FIGURE 2 is a plot comparing the unsaturated intensity coefficient and the maximum side band field, which is proportional to the maximum change in the microwave electric field as a function of pressure where pressure is first increased by adding pure sample and then further increased by adding impurities.

Combining Equations 8, 9, and 10 yields the desired equation,

(11) $\quad \eta = \dfrac{2\pi h}{\sqrt{3ck}} |\mu_{ij}| \dfrac{FN}{T} \nu_0^2 \left(\dfrac{\tau}{t}\right)^{1/2}$ Since the maximum side band field $\eta$ is directly proportional to the maximum electromagnetic radiation field change, $\Delta_{\text{field}}$ MAX., the useful properties of $\Delta_{\text{field}}$ MAX. can be illustrated by comparing the properties of $\eta$ with the properties of the unsaturated intensity coefficient, $\gamma_0$. This may be done by comparing Equations 11 and 9 and by assuming that $\tau = t$ or that $\tau/t$ is a constant. Thus, it is seen that the maximum side band field amplitude $\eta$ is proportional to $FN$, the number of molecules of the absorbing specie, whereas the unsaturated intensity coefficient $\gamma_0$ is proportion to $FN\tau$. Since for a pressure broadened absorption $\tau$ is proportion to $1/N$ a further comparison of maximum side band field amplitude $\eta$ and the unsaturated intensity coefficient $\gamma_0$ can be easily accomplished by examining both $\eta$ and $\gamma_0$ as a function of pressure where the total pressure is the sum of the partial pressures of the absorbing specie and impurities. As shown by the curve 14 in FIGURE 2 the intensity coefficient $\gamma_0$ is independent of a change in the pressure of pure sample, but decreases with increasing pressure when nonabsorbing material, that is, impurities are added to the sample. The maximum side band field amplitude $\eta$, however, varies linearly with pressure for the pure sample and is independent of the concentration of the non-absorbing material, or impurities, as shown by the curve 16 in FIGURE 2. Thus, under any pressure conditions the maximum side band field amplitude $\eta$ gives a measure of the number of the absorbing specie, whereas the intensity coefficient $\gamma_0$ does not.

The rate of change of the maximum side band field amplitude $\eta$ with temperature can also be utilized to gain information about the molecular distribution functions.

By inspection of Equations 11 and 9 one can see that the temperature coefficient of the maximum side band field amplitude $\eta$ depends on the variation of $F$ with temperature, since $\tau/t$ has been assumed equal to one, whereas the temperature coefficient of the intensity coefficient $\gamma_0$ additionally depends on the variation of $\tau$ with temperature. The rate of change of $P_\eta$, the power required to measure the maximum side band field amplitude $\eta$, as a function of temperature also gives information on the temperature dependence of molecular relaxation processes since $P_\eta$ depends on $|\mu_{1j}|^2$ and $\tau^2$ because $P_\eta$ is equal to $$\dfrac{\lambda}{\lambda_g} \dfrac{C}{8\pi K'^2}$$

where $\lambda$ is the free space wavelength and $\lambda_g$ is the waveguide wavelength.

Measuring the maximum sideband field amplitude $\eta$ provides maximum signal and thus maximum sensitivity. On the other hand the unsaturated intensity coefficient $\gamma_0$ must be measured at low power levels because of power saturation. This means less signal and thus lower sensitivity.

While the above description has assumed a uniform power density throughout the sample this need not necessarily be the case. The maximum sideband field amplitude $\eta$, and the power required to measure it, $P_\eta$, for the non-uniform spacial power density case are each related to the uniform power density distribution case by a constant which depends only on the power density distribution. Therefore, the properties of the maximum sideband field amplitude $\eta$, and the power required to measure it, $P_\eta$, for the nonuniform power density distribution case are the same as those described above.

Figure 3:
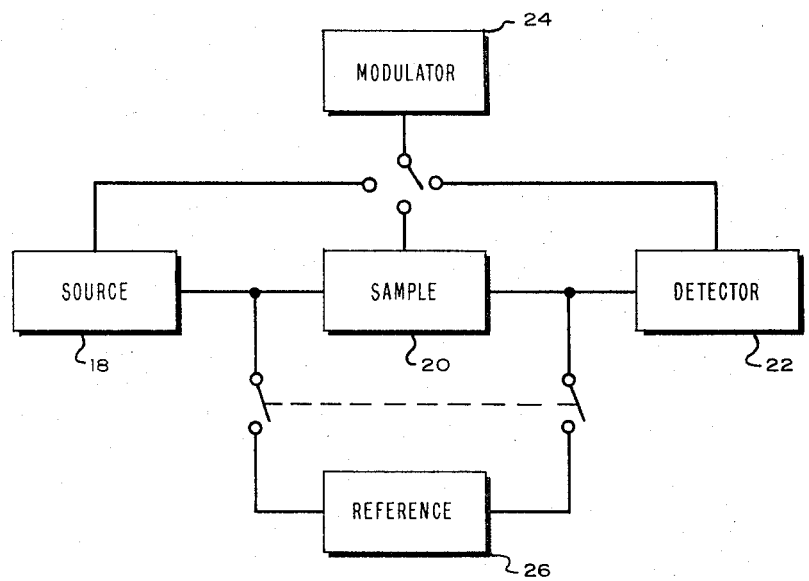
FIGURE 3 is a block diagram of apparatus for implementing the method of this invention.

The method of this invention may be implemented in the microwave region of the electromagnetic radiation spectrum with apparatus such as that shown in the copending patent application Ser. No. 342,487 of Nicholas J. Kuhn filed on Feb. 4, 1964, issued as U.S. Patent No. 3,317,827 on May 2, 1967, and assigned to Hewlett-Packard Company (the same assignee as the present invention). However, this method may also be implemented for substantially the entire electromagnetic radiation spectrum indicated by the more general apparatus shown in block form in FIGURE 3. A source 18 applies electromagnetic radiation to a sample containing means 20 for interacting the electromagnetic radiation with the sample to produce a selected spectroscopic transition for which there is a corresponding change, $\Delta_{\text{field}}$, in the field components of the interacting electromagnetic radiation. The electromagnetic radiation power density in the sample is altered, for example, by changing the amount of electromagnetic radiation applied by the source 18 to the sample. A detector 22 is coupled to the sample containing means 20 for detecting the electromagnetic radiation field change, $\Delta_{\text{field}}$, to determine the maximum field change, $\Delta_{\text{field}}$ MAX. In order to increase the sensitivity of the system comprising blocks 18–22, a modulator 24 may be coupled to either the source 18, the sample containing means 20, or the detector 22 for applying a time-varying signal thereto to produce a time variation of the field changes, $\Delta_{\text{field}}$. A reference arm 26 may also be connected across the sample containing means 20 as shown in FIGURE 3 for the purpose of optimizing the performance of detector 22 independent of the power level in the sample.

We claim:
1. A method for analyzing a sample of matter of the type in which a spectroscopic transition may be produced by the interaction of electromagnetic radiation with the sample at the frequency of the spectroscopic transition, said method comprising the steps of:
  applying electromagnetic radiation including electric and magnetic field components to the sample for interacting with the sample at a selected frequency to produce a spectroscopic transition causing a cor- responding change in each field component of the electromagnetic radiation interacting with the sample;

varying the power density of the electromagnetic radiation interacting with the sample at the selected frequency to vary the change in each field component of the electromagnetic radiation interacting with the sample; and detecting variations in the change of a selected field component of the electromagnetic radiation interacting with the sample at the selected frequency with variations in the power density of the electromagnetic radiation interacting with the sample for determining the maximum change of the selected field component.

2. The method of claim 1:
including the additional step of time-varying the change in the selected field component; and
wherein the detecting step comprises detecting the variation with time of the change in the selected field component for different power densities of the electromagnetic radiation interacting with the sample at the selected frequency.

3. The method of claim 1:
including the additional step of time-varying the interaction of the electromagnetic radiation with the sample for producing a sideband field; and
wherein the detecting step comprises detecting the amplitude of the sideband field for different power densities of the electromagnetic radiation interacting with the sample at the selected frequency.

4. A method for analyzing a sample of matter in which a spectroscopic transition may be produced by the interaction of electromagnetic radiation with the sample at the frequency of the spectroscopic transition, said method comprising the steps of:
applying electromagnetic radiation including electric and magnetic field components to the sample to be analyzed, said radiation interacting with the sample at a selected frequency to produce a spectroscopic transition causing a corresponding change in each field component of the electromagnetic radiation interacting with the sample;
varying the power density of the electromagnetic radiation interacting with the sample at the selected frequency to vary the change in a selected field component of the electromagnetic radiation interacting with the sample along a curve relating the change in the selected field component to the power density of the electromagnetic radiation interacting with the sample; and
detecting the change in the selected field component for at least two different radiation power densities in the sample, at least one of these power densities being above the power saturation threshold of the sample, so as to obtain spectroscopic transition data at a determinable position along this curve.

5. A method as in claim 4 wherein the sample has a broadening time $\tau$, a relaxation time $t$, and a molecular concentration N and wherein the ratio of the broadening time $\tau$ to the relaxation time $t$ is held constant so that the spectroscopic transition data obtained is a linear function of the molecular concentration N and independent of the broadening time $\tau$ and the relaxation time $t$.

6. A method as in claim 4 wherein the sample has a broadening time $\tau$, a relaxation time $t$, and a molecular concentration N and wherein the molecular concentration N is held constant so that the spectroscopic transition data obtained is a measure of the ratio of the broadening time $\tau$ to the relaxation time $t$.

7. A method as in claim 4:
including the additional step of time-varying the change in the selected field component; and
wherein the detecting step comprises detecting the variation with time of the change in the selected field component for at least two different power densities of the electromagnetic radiation interacting with the sample at the selected frequency.

8. A method as in claim 4:
including the additional step of time-varying the interaction of the electromagnetic radiation with the sample for producing a sideband field; and
wherein the detecting step comprises detecting the amplitude of the sideband field for at least two different power densities of the electromagnetic radiation interacting with the sample at the selected frequency.

9. A method as in claim 4 wherein the applied electromagnetic radiation is in the microwave region.

References Cited

UNITED STATES PATENTS

| | | | |
|---|---|---|---|
| 2,637,767 | 5/1953 | Hershberger | 324—58.5 |
| 2,792,548 | 5/1957 | Hershberger | 324—58.5 |

RUDOLPH V. ROLINEC, *Primary Examiner.*

P. F. WILLE, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,440,529                                       April 22, 1969

Richard H. Bauhaus et al.

It is certified that error appears in the above identified patent and that said Letters Patent are hereby corrected as shown below:

Column 3, lines 33 to 35, after equation (10) insert -- where: --; line 45, after "field" insert -- amplitude --; line 55, "proportion" should read -- proportional --; line 56, "proportion" should read -- proportional --. Column 4, lines 1 14, in the equation, "$K'^2$" should read -- $K'$ --.

Signed and sealed this 14th day of April 1970.

(SEAL)
Attest:

Edward M. Fletcher, Jr.                            WILLIAM E. SCHUYLER, JR

Attesting Officer                                           Commissioner of Patents